United States Patent
Seo et al.

(10) Patent No.: US 9,524,266 B2
(45) Date of Patent: Dec. 20, 2016

(54) LATENCY MANAGEMENT SYSTEM AND METHOD FOR MULTIPROCESSOR SYSTEM

(75) Inventors: Woong Seo, Hwaseong-si (KR); Soo-Jung Ryu, Hwaseong (KR); Moo-Kyoung Chung, Yongin-si (KR); Ho-Young Kim, Seoul (KR); Young-Chul Cho, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1085 days.

(21) Appl. No.: 13/163,948

(22) Filed: Jun. 20, 2011

(65) Prior Publication Data

US 2012/0151154 A1 Jun. 14, 2012

(30) Foreign Application Priority Data

Dec. 8, 2010 (KR) .................. 10-2010-0125074

(51) Int. Cl.
| | |
|---|---|
| *G06F 12/00* | (2006.01) |
| *G06F 13/00* | (2006.01) |
| *G06F 13/28* | (2006.01) |
| *G06F 15/167* | (2006.01) |

(52) U.S. Cl.
CPC .................. *G06F 15/167* (2013.01)

(58) Field of Classification Search
CPC ............ G11C 2207/2272; G06F 5/06; G06F 2217/84; G06F 9/52

USPC .......................................... 711/150, 151, 152
See application file for complete search history.

(56) References Cited

U.S. PATENT DOCUMENTS

| | | | | |
|---|---|---|---|---|
| 5,167,022 | A | * 11/1992 | Bahr et al. | 710/108 |
| 5,960,458 | A | * 9/1999 | Kametani | 711/147 |
| 6,567,873 | B1 | * 5/2003 | Henriksen | 710/240 |
| 2005/0273310 | A1 | * 12/2005 | Newburn | 703/17 |
| 2006/0053143 | A1 | * 3/2006 | Liu et al. | 707/102 |
| 2006/0143392 | A1 | * 6/2006 | Petev et al. | 711/133 |
| 2008/0046665 | A1 | 2/2008 | Kim | |
| 2008/0082728 | A1 | * 4/2008 | Traister et al. | 711/103 |
| 2011/0296143 | A1 | * 12/2011 | Shim et al. | 712/214 |

FOREIGN PATENT DOCUMENTS

| | | |
|---|---|---|
| JP | 2005-352559 | 12/2005 |
| JP | 2007-280127 | 10/2007 |
| JP | 2009-116561 | 5/2009 |
| KR | 10-2007-0112950 | 11/2007 |

* cited by examiner

*Primary Examiner* — Charles Rones
*Assistant Examiner* — Sidney Li
(74) *Attorney, Agent, or Firm* — NSIP Law

(57) ABSTRACT

A latency management apparatus and method are provided. A latency management apparatus for a multiprocessor system having a plurality of processors and shared memory, when the shared memory and each of the processors is configured to generate a delayed signal, includes a delayed signal detector configured to detect the generated delayed signal; and one or more latency managers configured to manage an operation latency of any one of the processors upon detection of the delayed signal.

11 Claims, 2 Drawing Sheets

LATENCY MANAGEMENT SYSTEM AND METHOD FOR MULTIPROCESSOR SYSTEM

CROSS-REFERENCE TO RELATED APPLICATION

This application claims the benefit under 35 U.S.C. §119(a) of a Korean Patent Application No. 10-2010-0125074, filed on Dec. 8, 2010, in the Korean Intellectual Property Office, the entire disclosure of which is incorporated herein by reference for all purposes.

BACKGROUND

1. Field

The following description relates to process latency management, and more particularly, to a technique for process latency management in a multiprocessor system with shared memory.

2. Description of the Related Art

Various methods have been developed to efficiently deal with data transmission between processors in a multiprocessor system. In general, representative methods of such methods include a method of using symmetric shared memory based on an interconnection network or buses, and a method of using distributed shared memory.

In the case of using shared memory, since data is transmitted through an interconnection network or buses, an access latency increases compared to the case where no shared memory is used. Accordingly, data transmission using shared memory has to accompany efficient management of delayed signals from each processor and the shared memory.

SUMMARY

In one general aspect, a latency management apparatus for a multiprocessor system having a plurality of processors and shared memory is provided, the shared memory and each of the processors being configured to generate a delayed signal, the apparatus including a delayed signal detector configured to detect the generated delayed signal, and one or more latency managers configured to manage an operation latency of any one of the processors upon detection of the delayed signal.

The latency management apparatus of the one general aspect may further provide that the plurality of processors include one of the processors that generates the delayed signal and other ones of the processors that do not generate the delayed signal. The latency management apparatus may further provide that the one or more latency managers are further configured to manage operation latencies of the other ones of the processors based on whether the one of the processors requests access to the shared memory.

The latency management apparatus of the one general aspect may further provide that the one or more latency managers are further configured to delay neither operation of the shared memory nor operations of the other ones of the processors if there is no request by the one of the processors to access the shared memory.

The latency management apparatus of the one general aspect may further provide that the one or more latency managers are further configured to temporarily stop operations of the other ones of the processors in order to delay the operations of the other ones of the processors if the one of the processors requests access to the shared memory.

The latency management apparatus of the one general aspect may further provide that the one or more latency managers are further configured to delay execution of data stored in the shared memory without changing a shared memory timestamp value if the one of the processors requests access to the shared memory, the shared memory timestamp value being initialized upon reception of an access request to the shared memory and changed every cycle.

The latency management apparatus of the one general aspect may further provide that, when a delayed signal generated from the shared memory is detected by the delayed signal detector, the one or more latency managers are further configured to delay operations of all of the processors sharing the shared memory by temporarily stopping the operations of all of the processors, regardless of whether one or more of the processors has requested access to the shared memory.

The latency management apparatus of the one general aspect may further provide that, when a cache memory error is generated from one or more of the processors or a dedicated memory of the one or more of the processors, the delayed signal detector detects a delayed signal generated from the one or more of the processors.

In another aspect, a latency management method performed by a multiprocessor system having a plurality of processors and shared memory is provided, the shared memory and each of the processors being configured to generate a delayed signal, the method including detecting the generated delayed signal, and managing an operation latency of any one of the processors upon the detecting of the generated delayed signal.

The latency management method may further provide that the plurality of processors include one of the processors that generates the delayed signal and other ones of the processors that do not generated the delayed signal. The latency management method may further provide that the managing of the operation latency comprises managing operation latencies of the other ones of the processors based on whether the one of the processors requests access to the shared memory.

The latency management method may further provide that the managing of the operation latency further comprises delaying neither operation of the shared memory nor operations of the other ones of the processors if there is no request by the one of the processors to access the shared memory.

The latency management method may further provide that the managing of the operation latency further comprises temporarily stopping operations of the other ones of the processors in order to delay the operations of the other ones of the processors if the one of the processors requests access to the shared memory.

The latency management method may further provide that the managing of the operation latency further comprises delaying execution of data stored in the shared memory, without changing a shared memory timestamp value if the one of the processors requests access to the shared memory, the shared memory timestamp value being initialized upon reception of an access request to the shared memory and changed every cycle.

The latency management method may further provide that, when the detecting of the generated delayed signal detects a delayed signal generated from the shared memory, the managing of the operation latency comprises delaying operations of all of the processors sharing the shared memory by temporarily stopping the operations of all of the processors, regardless of whether one or more of the processors has requested access to the shared memory.

The latency management method may further provide that the detecting of the generated delayed signal comprises, when a cache memory error is generated from one or more of the processors or a dedicated memory of the one or more of the processors, detecting a delayed signal generated from the one or more of the processors.

In another aspect, a latency management apparatus is provided, including a delayed signal detector configured to detect a delayed signal generated from a processor, a shared memory used by the processor, or any combination thereof, and a latency manager configured to manage an operation latency of the processor in response to the detection of the delayed signal by the delayed signal detector.

The latency management apparatus of the other aspect may provide that the latency manager is further configured to permit an operation of the shared memory when the processor generates the detected delayed signal and does not request access to the shared memory.

The latency management apparatus of the other aspect may provide that the latency manager is further configured to delay an execution of a request made of the shared memory by an other processor when the processor generates the detected delayed signal and requests access to the shared memory.

The latency management apparatus of the other aspect may provide that the latency manager is further configured to delay operations of an other processor using the shared memory when the processor generates the detected delayed signal and requests access to the shared memory.

The latency management apparatus of the other aspect may provide that the latency manager is further configured to transfer data related to the request made of the shared memory by the other processor after a predetermined latency time elapses, the data being transferred to the other processor.

The latency management apparatus of the other aspect may provide that the latency manager is further configured to delay operations of the processor when the shared memory generates the detected delayed signal.

Other features and aspects may be apparent from the following detailed description, the drawings, and the claims.

Figure 1:
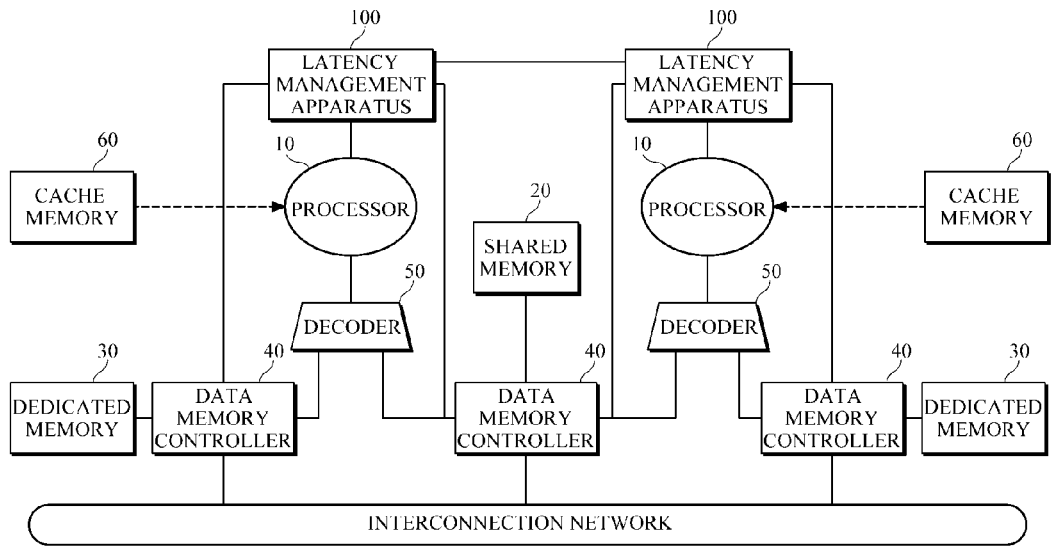
FIG. 1 is a diagram illustrating an example where latency management apparatuses are installed in a multiprocessor system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. In addition, descriptions of well-known functions and constructions may be omitted for increased clarity and conciseness.

Figure 2:
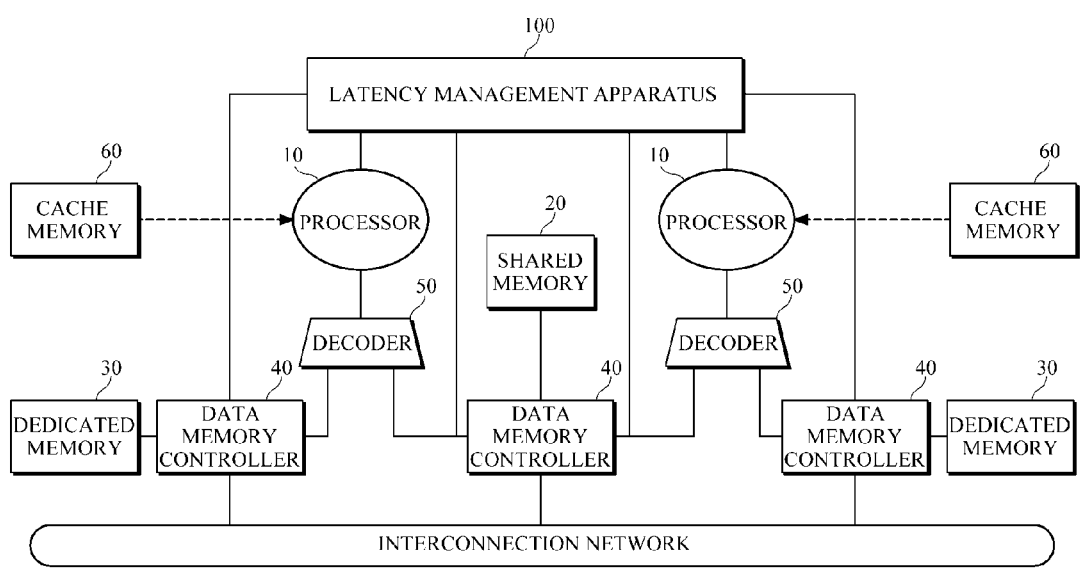
FIG. 2 is a diagram illustrating an example where a latency management apparatus is installed in a multiprocessor system.

FIG. 1 is a diagram illustrating an example where two or more latency management apparatuses 100 are installed in a multiprocessor system, and FIG. 2 is a diagram illustrating an example where a latency management apparatus 100 is installed in a multiprocessor system.

In the example of FIG. 1, latency management apparatuses 100 may be installed respectively for a plurality of processors 10 of a multiprocessor system with shared memory 20 to manage the latency of each of the processors 10. Meanwhile, in the example of FIG. 2, a latency management apparatus 100 may be integrally installed in a multiprocessor system with shared memory 20 to integrally manage the latencies of each of the processors 10.

In FIGS. 1 and 2, the shared memory 20 is memory that the plurality of processors 10 share. Further, dedicated memory 30 is memory that each processor 10 privately uses. In addition, a data memory controller 40 functions to control memory access, and a decoder 50 functions to interpret memory access addresses.

When a large amount of data transmission occurs between processors of a multiprocessor system, equal model scheduling may be applied, which installs shared memory 20 between the processors to minimize access latency.

In the case of a processor using equal model scheduling, hardware of the processor's memories may have to be designed to ensure a fixed latency. For purposes of the examples described herein, the term "latency" means a cycle in which data is actually read after a read request is generated.

For example, memories may be designed such that the operation of the processor is temporarily stopped when latency is lengthened to exceed a predetermined time due to conflicts between read requests of other processors.

In addition, the memories may be designed to delay previously requested data that is waiting to be executed when the processor is temporarily stopped due to errors, etc. The memories may delay the data until the processor resumes operation. The memories then may transfer the data to the processor after a predetermined latency time elapses.

Meanwhile, since the processor, which uses the equal model scheduling, has a predetermined cycle for each instruction, the processor cannot ensure a latency when an instruction causing memory operation uses an external memory (for example, a L1 memory, a L2 memory, etc.) of the processor instead of an internal memory of the processor (for example, a L0 memory). This may result in performance deterioration of the processor.

Accordingly, by efficiently delaying the operation of each processor of the multiprocessor system when a delayed signal is generated from the processor or from the shared memory 20, the performance of the multiprocessor system may be improved.

Figure 3:
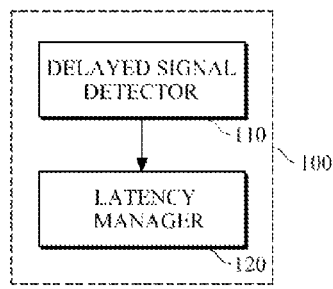
FIG. 3 is a diagram illustrating an example of a latency management apparatus that is installed in a multiprocessor system having shared memory.

FIG. 3 is a diagram illustrating an example of the latency management apparatus 100 installed in the multiprocessor system having shared memory 20. Referring to FIG. 3, the latency management apparatus 100 includes a delayed signal detector 110 and a latency manager 120.

The delayed signal detector 110 is configured to detect delayed signals generated from each of the processors of the multiprocessor system or the shared memory 20 of the multiprocessor system. For example, the delayed signal detector 110 may be configured to detect a delayed signal from a specific processor from whose dedicated memory (30 of FIGS. 1 and 2) or cache memory (60 of FIGS. 1 and 2) an error is generated.

The latency manager 120 is configured to manage an operation latency of each processor of the multiprocessor system in response to a detection of a delayed signal by the delayed signal detector 110. At this time, the latency manager 120 may operate differently depending on whether the delayed signal is generated from a specific processor or from the shared memory 20.

Specifically, when the delayed signal detector 110 detects a delayed signal generated from a specific processor, the latency manager 120 may be configured to manage operation latencies of other processors from which no delayed signal has been generated, depending on whether the processor from which the delayed signal has been generated has requested access to the shared memory 20.

If the processor generating the delayed signal does not request access to the shared memory 20, the latency manager 120 may be configured not to delay the operations of the shared memory 20 or the other processors not generating a delayed signal.

In other words, since the processor influences neither the shared memory 20 nor the other processors using the shared memory 20 if the processor has not requested access to the shared memory 20, the latency manager 120 does not need to delay the operations of the shared memory 20 or the other processors from which no delayed signal has been generated.

On the contrary, if the processor generating the delayed signal does request access to the shared memory 20, the latency manager 120 may temporarily stop the respective operations of the other processors from which no delayed signal has been generated to delay the operations of the other processors.

That is, since the processor influences the operations of all the shared memory 20 and the other processors using the shared memory 20 if the processor has requested access to the shared memory, the latency manager 120 temporarily stops the operations of the other processors from which no delayed signal has been generated in order to delay the operations of the shared memory 20 and the other processors.

In addition, when the processor generating the delayed signal requests access to the shared memory 20, the latency manager 120 may delay execution of data stored in the shared memory 20, without changing a shared memory timestamp value that is initialized upon reception of an access request to the shared memory 20 and changed every cycle.

In other words, when a delayed signal is generated from a specific processor and thus the operation of another processor from which no delayed signal is generated is temporarily stopped, the shared memory 20 may delay a previous request for execution of data until the operation of the other processor not generating a delayed signal is resumed, and, then, transfer the data to the other processor not generating a delayed signal after a predetermined latency time elapses.

Meanwhile, a delayed signal generated from the shared memory 20 may influence the operations of all processors using the shared memory 20. Therefore, when the delayed signal detector 110 detects a delayed signal generated from the shared memory 20, the latency manager 120 may delay the operations of all processors that share the shared memory 20 by temporarily stopping the respective operations, regardless of whether a processor has requested access to the shared memory 20.

Accordingly, when the delayed signal detector 110 detects a delayed signal generated from a specific processor, the latency management apparatus 100 of the multiprocessor system temporarily stops the operations of other processors from which no delayed signal has been generated, only when the specific processor has requested access to the shared memory 20, thus delaying the operation of the other processors.

Meanwhile, when the delayed signal detector 110 detects a delayed signal generated from the shared memory 20, the latency manager of the multiprocessor system temporarily stops the operations of all processors that share the shared memory 20 regardless of whether a specific processor has requested access to the shared memory, thus delaying the operations of all the processors.

In this way, the latency management apparatus 100 efficiently delays the operation of each processor of the multiprocessor system when a delayed signal is generated from the processor or from the shared memory 20 of the multiprocessor system, thereby improving system performance.

Figure 4:
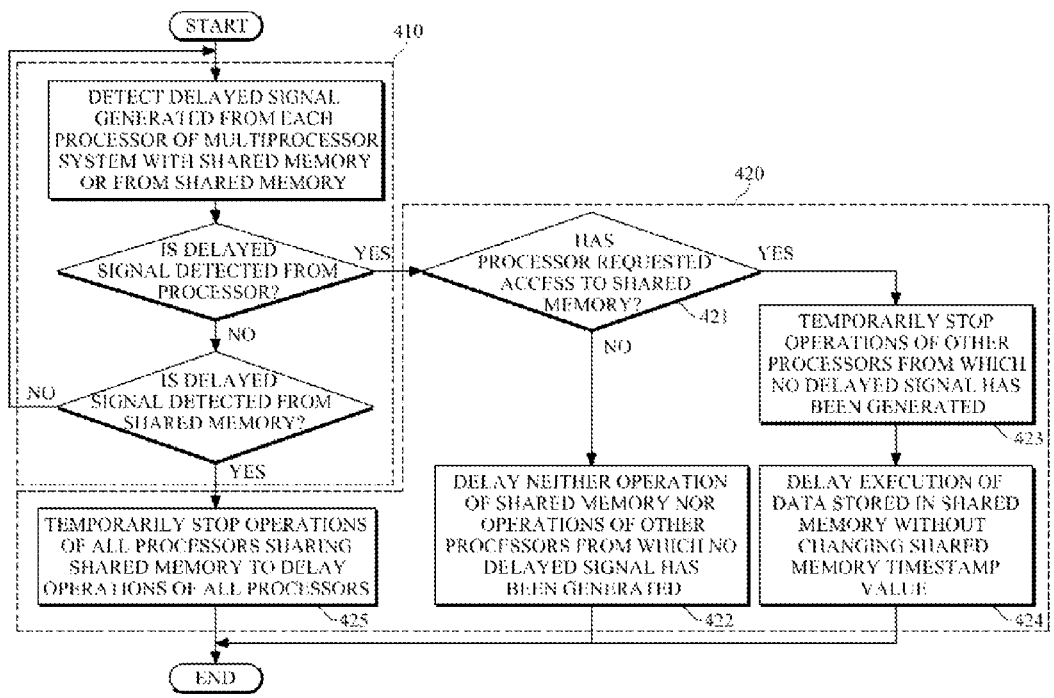
FIG. 4 is a flowchart illustrating an example of a latency management method that is performed by a latency management apparatus of a multiprocessor system having shared memory.

FIG. 4 is a flowchart illustrating an example of a latency management method performed by the latency management apparatus 100 of the multiprocessor system having shared memory 20.

First, the latency management apparatus 100 is configured to detect a delayed signal generated from each processor of the multiprocessor system with the shared memory or from the shared memory 20 of the multiprocessor system (410). For example, when a cache memory error is generated from a cache memory 60 or from a dedicated memory 30 of the specific processor, the latency management apparatus 100 may detect a delayed signal generated from the corresponding processor.

Then, the latency management apparatus 100 manages the operation latency of each processor of the multiprocessor system (420). For example, when a delayed signal generated from a specific processor is detected (410), the latency management apparatus 100 manages the operation latencies of other processors from which no delayed signal has been generated according to whether the processor from which the delayed signal has been generated has requested access to the shared memory 20 (421).

If the processor from which no delayed signal has been generated has not requested access to the shared memory 20, the latency management apparatus 100 delays neither the operation of the shared memory 20 nor the operations of the other processors from which no delayed signal has been generated (422). That is, since the processor from which a delayed signal has been generated but which has not requested access to the shared memory 20 influences neither the operation of the shared memory 20 nor the operations of other processors using the shared memory 20, the latency management apparatus 100 delays neither the operation of the shared memory 20 nor the operations of the other processors.

If the processor from which a delayed signal has been generated has requested access to the shared memory 20, the latency management apparatus 100 temporarily stops the operations of the other processors from which no delayed signal has been generated to delay the operations of the other processors (423), and delays execution of data stored in the shared memory 20 without changing a shared memory timestamp value that is initialized upon reception of an access request to the shared memory 20 and changed every cycle (424).

That is, if the processor generating the delayed signal has an impact on the operations of the shared memory 20 and the other processors using the shared memory 20 by requesting access to the shared memory 20, the latency management apparatus 100 delays the operations of the other processors not generating a delayed signal by temporarily stopping the respective operations. At this time, the shared memory 20 delays previous requests for execution of data until the operation of the other processors not generating a delayed signal are resumed, and, then, transfers the data to the other processors not generating a delayed signal after a predetermined latency time elapses.

Meanwhile, when detecting a delayed signal generated from the shared memory 20 in operation 410, the latency management apparatus 100 temporarily stops the operations of all processors sharing the shared memory 20 regardless of whether or not the processor has requested access to the shared memory 20, thus delaying the operations of all the processors (425).

That is, if a delayed signal generated from the shared memory 20 influences the operations of all processors using the shared memory 20, the latency management apparatus 100 delays the operations of all processors that share the shared memory 20 by temporarily stopping the respective operations, regardless of whether a processor has requested access to the shared memory 20. Therefore, when a delayed signal has been generated from each processor of the multiprocessor system with shared memory or from the shared memory, the latency management apparatus efficiently delays the operation of the processor, thereby improving system performance.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher-level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to the examples described above, if a detection of a delayed signal generated from a specific processor of a multiprocessor system occurs, and the specific processor has requested access to a shared memory of the multiprocessor system, a latency management apparatus of the multiprocessor system may temporarily stop operations of other processors of the multiprocessor system not generating a delayed signal, thus delaying the respective operations of the other processors.

Further, according to the examples described above, if a detection of a delayed signal generated from the shared memory 20 occurs, the latency management apparatus may temporarily stop the operations of all processors that share the shared memory 20 regardless of whether a specific processor has requested access to the shared memory 20, thus delaying the operations of all the processors.

As a result, according to the examples described above, a latency management system and method for a multiprocessor system may efficiently delay operation of each processor of the multiprocessor system when a delayed signal is generated from a processor or from a shared memory of the multiprocessor system, thereby improving system performance.

It is understood that the terminology used herein (i.e., shared memory, dedicated memory, latency, etc.) may be different in other applications or when described by another person of ordinary skill in the art.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A latency management apparatus using an equal model scheduling which has a predetermined cycle for each instruction, the latency management apparatus comprising:
   a multiprocessor having processors and shared memory, the shared memory and each of the processors configured to generate a delayed signal;
   a delayed signal detector configured to detect the generated delayed signal; and
   one or more latency managers configured to manage an operation latency of any one of the processors depending on whether the delayed signal is generated from a specific processor among the processors or from the shared memory and whether the specific processor requests access to the shared memory,
   wherein the operation latency is a cycle in which data is read after a read request is generated,
   wherein the one or more latency managers are further configured to temporarily stop operations of the processors that do not generate the delayed signal, in response to the specific processor requesting access to the shared memory and generating the delayed signal,
   wherein the delayed signal is generated before shared memory access is granted to the specific processor requesting access to the shared memory, and
   wherein, the one or more latency managers are further configured to delay, in response to the shared memory generating the delayed signal, operations of all of the processors sharing the shared memory by temporarily stopping the operations of all of the processors, regardless of whether one or more of the processors has requested access to the shared memory.

2. The latency apparatus of claim 1, wherein the one or more latency managers are further configured to delay execution of data stored in the shared memory without changing a shared memory timestamp value, in response to the specific processor requesting access to the shared memory, the shared memory timestamp value being initialized upon reception of an access request to the shared memory and changed every cycle.

3. The latency apparatus of claim 1, wherein, the delayed signal is generated in response to a cache memory error generated from the one or more of the processors or a dedicated memory of the one or more of the processors.

4. A latency management method performed by a multiprocessor having processors and shared memory, the shared memory and each of the processors being configured to generate a delayed signal, the method comprising:
 detecting the generated delayed signal; and
 managing an operation latency of any one of the processors depending on whether the delayed signal is generated from a specific processor or from the shared memory and whether the specific processor requests access to the shared memory,
wherein the operation latency is a cycle in which data is read after a read request is generated,
wherein the managing of the operation latency comprises temporarily stopping operations of the processors that do not generate the delayed signal, in response to the specific processor requesting access to the shared memory and generating the delayed signal,
wherein the delayed signal is generated before shared memory access is granted to the specific processor requesting access to the shared memory, and
wherein, the managing of the operation latency further comprises delaying, in response to the shared memory generating the delayed signal, operations of all of the processors sharing the shared memory by temporarily stopping the operations of all of the processors, regardless of whether one or more of the processors has requested access to the shared memory.

5. The latency management method of claim 4, wherein the managing of the operation latency further comprises delaying execution of data stored in the shared memory, without changing a shared memory timestamp value, in response to the specific processor requesting access to the shared memory, the shared memory timestamp value being initialized upon reception of an access request to the shared memory and changed every cycle.

6. The latency management method of claim 4, wherein the detecting of the generated delayed signal comprises detecting the delayed signal generated in response to a cache memory error generated from one or more of the processors or a dedicated memory of the one or more of the processors.

7. A latency management apparatus using an equal model scheduling which has a predetermined cycle for each instruction, the latency management apparatus comprising:
 a multiprocessor having processors and shared memory, the shared memory and each of the processors configured to generate a delayed signal;
 a delayed signal detector configured to detect the delayed signal generated by any of the processors, the shared memory used by the processors, or any combination thereof; and
 a latency manager configured to manage an operation latency of the processors depending on whether the delayed signal is generated from a specific processor among the processors or from the shared memory and whether the specific processor requests access to the shared memory,
wherein the operation latency is a cycle in which data is read after a read request is generated,
wherein the latency manager is further configured to temporarily stop operations of the processors that do not generate the delayed signal, in response to the specific processor requesting access to the shared memory and generating the delayed signal,
wherein the delayed signal is generated before shared memory access is granted to the specific processor requesting access to the shared memory, and
wherein, the latency manager is further configured to delay, in response to the shared memory generating the delayed signal, operations of all of the processors sharing the shared memory by temporarily stopping the operations of all of the processors, regardless of whether one or more of the processors has requested access to the shared memory.

8. The latency management apparatus of claim 7, wherein the latency manager is further configured to permit an operation of the shared memory in response to any of the processors generating the detected delayed signal and not requesting access to the shared memory.

9. The latency management apparatus of claim 7, wherein the latency manager is further configured to delay an execution of a request made of the shared memory by a first of the processors in response to a second of the processors generating the detected delayed signal and requesting access to the shared memory.

10. The latency management apparatus of claim 9, wherein the latency manager is further configured to transfer data related to the request made of the shared memory by the first processor after a latency time elapses, the data being transferred to the first processor.

11. The latency management apparatus of claim 7, wherein the latency manager is further configured to delay operations of a first of the processors using the shared memory in response to a second of the processors generating the detected delayed signal and requesting access to the shared memory.

* * * * *